(12) United States Patent
Woerner et al.

(10) Patent No.: US 9,884,454 B2
(45) Date of Patent: Feb. 6, 2018

(54) METHOD FOR PRODUCING AN OPENING IN A FIBER COMPOSITE COMPONENT

(71) Applicant: Dr. Ing. h.c. F. Porsche Aktiengesellschaft, Stuttgart (DE)

(72) Inventors: Lukas Woerner, Stuttgart (DE); Carsten Freymueller, Schloss Holte Stukenbrock (DE); Christian Goetze, Wohlenschwil (CH)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 324 days.

(21) Appl. No.: 14/623,792

(22) Filed: Feb. 17, 2015

(65) Prior Publication Data

US 2015/0231823 A1    Aug. 20, 2015

(30) Foreign Application Priority Data

Feb. 18, 2014   (DE) .................. 10 2014 102 024

(51) Int. Cl.

| B29C 70/14 | (2006.01) |
|---|---|
| B29C 67/00 | (2017.01) |
| B29C 45/14 | (2006.01) |
| B29C 70/74 | (2006.01) |
| B29C 70/54 | (2006.01) |
| B29L 31/00 | (2006.01) |

(52) U.S. Cl.
CPC .... *B29C 67/0048* (2013.01); *B29C 45/14344* (2013.01); *B29C 70/545* (2013.01); *B29C 70/74* (2013.01); *B29C 2793/0045* (2013.01); *B29L 2031/72* (2013.01)

(58) Field of Classification Search
None
See application file for complete search history.

(56) References Cited

U.S. PATENT DOCUMENTS

| 2,648,177 | A | | 8/1953 | Mitchell et al. | |
|---|---|---|---|---|---|
| 3,354,510 | A | | 11/1967 | Cook | |
| 3,800,483 | A | | 4/1974 | Sherman | |
| 4,774,788 | A | | 10/1988 | Shacham et al. | |
| 4,805,273 | A | * | 2/1989 | Burke ................ | A41H 37/04 24/104 |

(Continued)

FOREIGN PATENT DOCUMENTS

| DE | 41 26 350 | 2/1993 |
|---|---|---|
| DE | 693 15 172 | 4/1998 |

(Continued)

OTHER PUBLICATIONS

German Office Action dated Sep. 26, 2014.

*Primary Examiner* — Edmund Lee
(74) *Attorney, Agent, or Firm* — Gerald E. Hespos; Michael J. Porco; Matthew T. Hespos

(57) ABSTRACT

A method is provided for introducing an opening on at least one component (B) of fiber composite material. The method includes introducing an opening (7) into the component (B) placed in a mold (1; 20). A form (4; 27) then is fashioned in the same mold (1; 20) in the vicinity of the opening. The method then includes filling a vicinity of the opening with plastic. The plastic forms a surround (5, 26) around the peripheral region of the component (B) that forms the opening (7).

2 Claims, 2 Drawing Sheets

(56) References Cited

U.S. PATENT DOCUMENTS

| | | | |
|---|---|---|---|
| 4,860,425 A | | 8/1989 | Kunisaki et al. |
| 4,956,139 A | * | 9/1990 | Koizumi ............ B29C 45/14221 |
| | | | 264/154 |
| 5,372,767 A | | 12/1994 | Zimmermann et al. |
| 5,940,949 A | | 8/1999 | Rink |
| 8,951,455 B2 | | 2/2015 | Kampke |
| 2011/0031643 A1 | | 2/2011 | Hache et al. |

FOREIGN PATENT DOCUMENTS

| | | |
|---|---|---|
| DE | 600 09 021 | 8/2004 |
| DE | 10 2009 056 580 | 5/2011 |
| DE | 10 2010 053 960 | 6/2012 |
| EP | 0 721 831 | 10/2001 |
| EP | 2 492 069 | 8/2012 |
| GB | 1 075 702 | 7/1967 |
| WO | 2011/095399 | 8/2011 |

\* cited by examiner

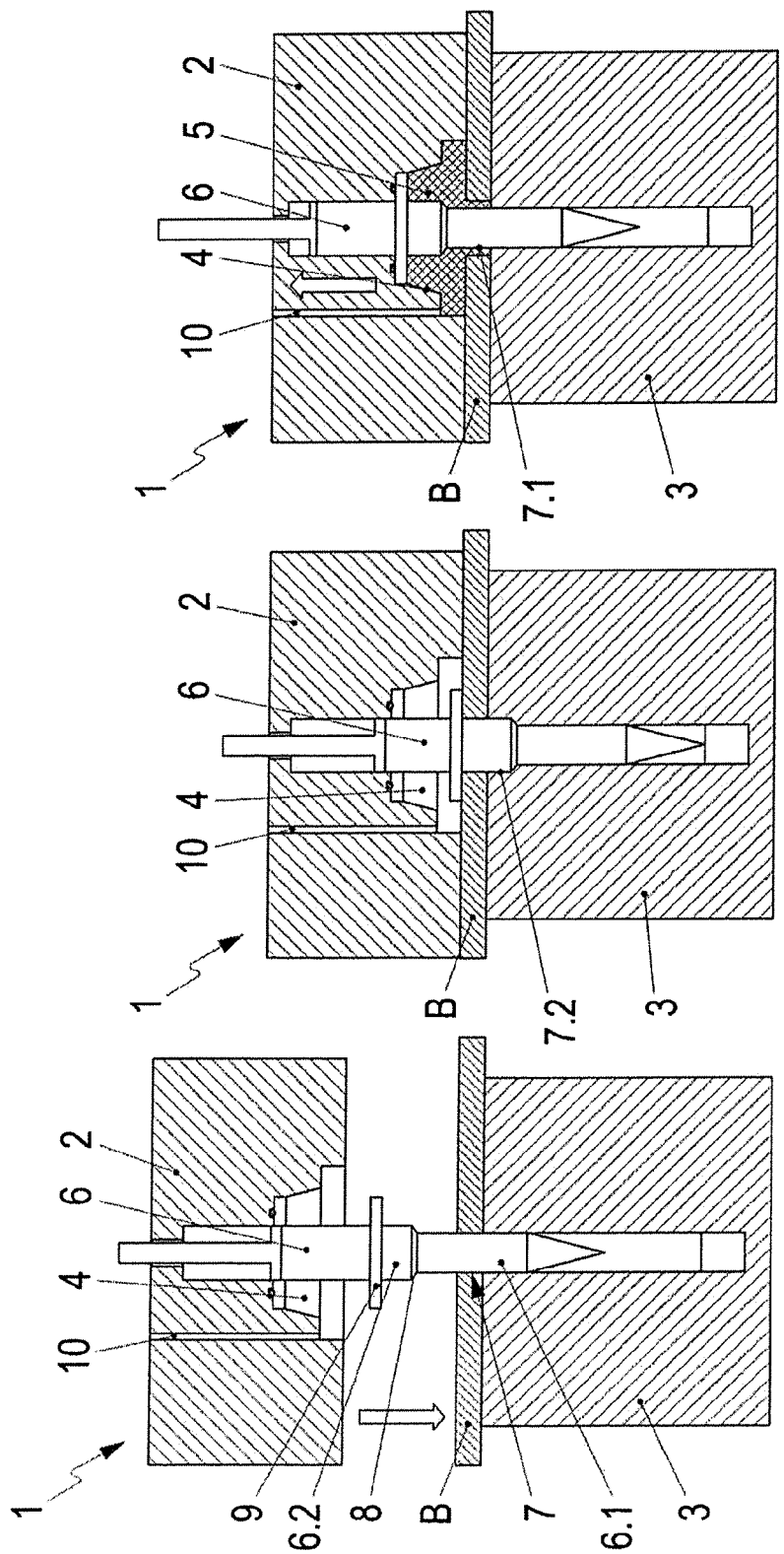

METHOD FOR PRODUCING AN OPENING IN A FIBER COMPOSITE COMPONENT

CROSS REFERENCE TO RELATED APPLICATION

This application claims priority under 35 USC 119 to German Patent Appl. No. 10 2014 102 024.3 filed on Feb. 18, 2014, the entire disclosure of which is incorporated herein by reference.

BACKGROUND

1. Field of the Invention

The invention relates to a method and a mold for producing an opening in a fiber composite component for connection to a second, in particular metallic, component.

2. Description of the Related Art

A lightweight structure comprising thin components or sheet-like components of a low weight is sought in vehicle construction, especially in the construction of production motor vehicles. Such components must exhibit adequate stability and also must have high corrosion resistance. However, it is relatively difficult to join add-on parts onto such sheet-like components—for example onto metal sheets or so-called organometallic sheets, such as axle components, hinges or locks for doors, flaps and hoods, in such a way that allows low weight and high stability to be achieved along with the best corrosion resistance. These add-on parts may include connections between bodyshell components or body structures where one component consists of organometallic sheet and the second component consists of aluminum.

Many proposals concerned with the production and the structure of such hybrid constructions have become known from the prior art. DE 600 09 021 T2 and EP 0 721 831 B1 describe methods and devices for assembling two metal sheets by means of injection molding or overmolding with plastics material, it being sought at the same time to achieve a stable connection by re-shaping the sheets in the injection mold.

DE 10 2010 053 960 A1 and US 2011/0031643 A1 describe methods for introducing inserts into metal sheets, for example organometallic sheets, without damaging the fibers. In this case, the insert is introduced into the body component by a mold core while being heated. In DE 10 2010 053 960 A1, the insert also is overmolded with plastic.

U.S. Pat. No. 4,860,425 discloses a method for connecting two metal sheets that are perforated with a punch and then are completely overmolded with plastic.

U.S. Pat. No. 4,956,139 describes attaching a plastic pin to a metal sheet by core deforming the sheet and subsequently overmolding the deformed location with plastic.

GB 1,075,702, U.S. Pat. No. 2,648,177, U.S. Pat. No. 3,354,510, U.S. Pat. No. 3,800,483 and U.S. Pat. No. 4,774,788 show devices and methods for producing sleeve-like components in the case of which the sleeve opening is overmolded with plastic.

Finally, DE 693 15 172 T2 discloses a method for producing electrical circuits by introducing metal inserts into a plastic component. In this case, the metal components placed in a mold are pre-perforated by one or more punches for the electrical insulation of the circuits, and after that are overmolded with plastic with the punches retracted.

The invention was based on the object of providing a method and a corresponding mold suitable for the simple and low-cost production of an opening in a fiber composite component for connection to a second, in particular metallic, component.

SUMMARY OF THE INVENTION

The invention relates to a method that includes introducing an opening into a fiber composite component placed in a mold. A form then is fashioned in the same mold in the vicinity of the opening and is filled with plastic, so that the plastic forms a layer around the peripheral region of the fiber composite component that forms the opening. Thus, an overmolding or encapsulation of the opening introduced by a needle, so that fraying of fibers around the peripheral region of the opening is prevented.

The method may further include placing the fiber composite component in a mold between a punch and a die. A needle corresponding to the contour of the opening and aligned substantially perpendicular to the fiber composite component then is moved into the fiber composite component. As a result, the opening is progressively formed by widening or displacing the surrounding fiber structure, without the fibers being damaged to any great extent.

The needle preferably has two sections over its length. The sections differ from each other in the extent of their width. The narrower section corresponds to the opening that is ultimately desired; while the wider section corresponds to the opening that is required to produce the overmolded layer of plastic. The difference between the two sections of the needle corresponds to this extent to the gap that is created and is filled with plastic in the second method step.

The movable needle may be mounted displaceably in the die or the punch to bring the sections of the needle into the operative position.

At least one feed hole may be provided in the punch and is connected to the form fashioned in the mold to facilitate the injection/pouring-in of the plastic.

With the openings corresponding to it in the punch and/or in the die, the needle preferably is dimensioned so that the needle and the die or punch at the same time form the sealing form.

The punch, the die and/or the needle may be mechanically or hydraulically movable for the introduction of the opening.

The component that is produced by the aforementioned method or with the aforementioned mold has an opening that is suitable for receiving fastening means. The peripheral region forming the opening may be surrounded by plastic so that no fraying of the fibers of the fiber composite component is possible and so that corrosion is prevented.

The method of the invention can be carried out with all known thermoplastic materials or polymer compounds.

Precise fixing of the sheet-like components in the mold between the punch and the die is provided to carry out the method.

Further advantages, features and details of the invention are described more specifically below on the basis of two exemplary embodiments with reference to the drawing.

BRIEF DESCRIPTION OF THE DRAWINGS

FIG. 1 shows a mold for performing the method according to the invention in a first embodiment.

FIG. 2 shows the mold as shown in FIG. 1 in a second position of the method.

FIG. 3 shows the mold as shown in FIG. 1 in a third position of the method.

DETAILED DESCRIPTION

Figure 6:
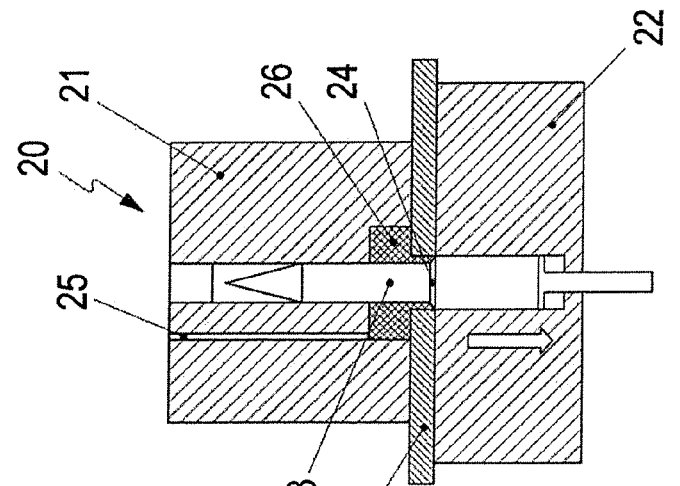
FIG. 6 shows the mold as shown in FIG. 4 in a third position of the method.

The mold 1 in FIGS. 1 to 3 includes a punch 2 and a die 3. The punch 2 is movable with respect to the die 3. To perform the method of the invention, as shown in FIG. 1, a fiber composite component B is placed in the mold 1 and fixed there. A form 4 is fashioned in the punch 2 and corresponds to the contour of the desired surround 5 of the opening 7.

A needle 6 is arranged in the punch 2. The punch 2 is movable substantially perpendicularly with respect to the die 3, and the needle 6, which is likewise movable substantially perpendicularly with respect to the sheet-like fiber composite component B and with respect to the die 3.

The needle 6 has a first needle section 6.1 that corresponds to the ultimately desired opening diameter or the opening contour thereof, that is to say the opening cross section of the surrounded opening 7.1. This needle section 6.1 goes over via a section 8 into a second needle section 6.2 that corresponds in its contour or its diameter to the opening cross section of the opening 7.2 that is necessary to create a gap that is to be filled with plastic in the next step. The difference between the two needle sections therefore corresponds to the thickness of the layer of plastic that surrounds the peripheral region of the opening 7. A further section 9 on the needle 6 serves for sealing (see FIG. 3) when the plastic is introduced.

FIG. 2 shows the method step in which the needle 6 has been moved until the section 6 comes up against the fiber composite component B. The opening 7.2 has now been formed in the fiber composite component B. After completion of this method step, as shown in FIG. 2, the needle is mechanically or hydraulically retracted into the punch 2, in the position shown in FIG. 3, and to this extent the needle section 6.1 is brought into the operative position. Now plastic—preferably heated—is introduced (injected) via the feed hole 10 in the punch 2 and completely fills the form 4 and the opening formed by the needle region 6.2 in the fiber composite component B to form the surround 5. In this way, the peripheral region of the opening 7.2 is sealed.

Figure 5:
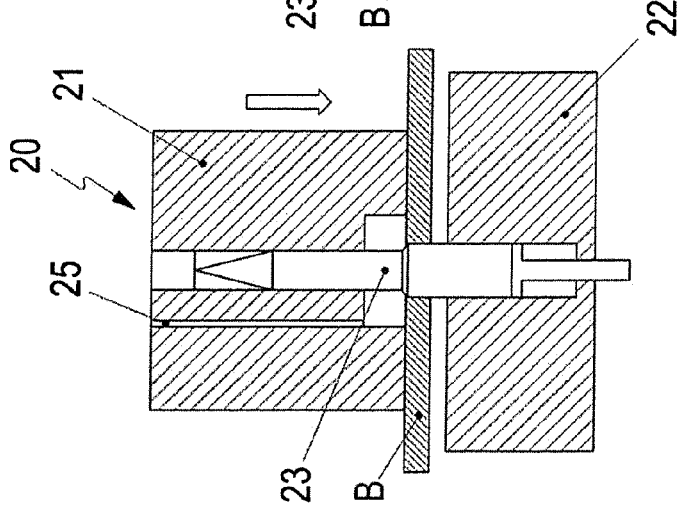
FIG. 5 shows the mold as shown in FIG. 4 in a second position of the method.
Figure 4:
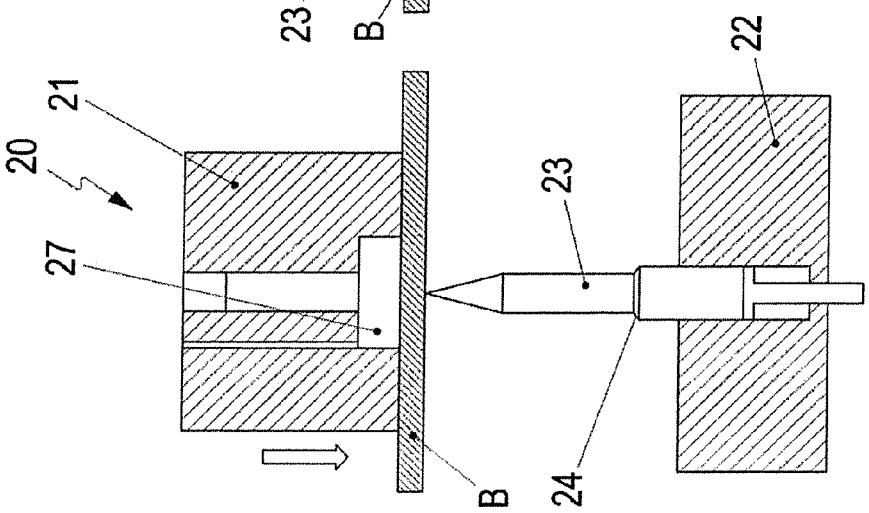
FIG. 4 shows a second embodiment of a mold for performing the method according to the invention in a first position of the method.

FIGS. 4, 5 and 6 show an alternative structure of the mold 20. This mold too consists of a punch 21 and a die 22. However, as a difference from the exemplary embodiment in FIGS. 1 to 3, the movable needle 23 is mounted in the die 22 rather than in the punch 21. As a further difference from the exemplary embodiment in FIGS. 1 to 3, the fiber composite component B is not placed on the die and fixed, but is moved onto the die 22 by the punch 21 that is movable toward the die 22. Otherwise, the sequence of the method is substantially the same as the sequence of the method as described above with reference to FIGS. 1 to 3. As soon as the openings in the sheet-like component B have been formed by the needle 23 (FIG. 5), the needle is retracted from the opening in the sheet-like component B, specifically only to the extent that its section 24 tightly seals the opening, so that, by introducing heated plastic via the feed holes 25, the surround 26 can be formed in the form 27 fashioned in the punch 21, including the covering of the walls of the opening.

To remove the fiber composite component B together with the surround 5 or 26, the punch 2 or 21 and the needle 6 or 23 are retracted.

It goes without saying for a person skilled in the art that the form 4 or 27 and also the widened openings formed by the sections 8 and 24 may be provided in any desired form that is structurally required. Forms for injecting plastic may of course also be provided both in the punch and in the die, so that not only does the formed plastic component cover the opening and just one side of the sheet-like component, but also formations are provided on both sides around the opening with respect to the sheet-like component B.

What is claimed is:

1. A method for introducing an opening into at least one component of fiber composite material so that the opening has a specified inside diameter, comprising:

providing a needle with a tip, a cross-sectionally large portion spaced from the tip and a cross-sectionally small portion between the cross-sectionally large portion and the tip, the cross-sectionally large portion having an outside diameter equal to the specified inside diameter;

placing the component between a die and a punch of a mold, the punch having a cavity of a specified form;

introducing an opening into the component placed in the mold by closing the punch against the component and forcing the tip, the cross-sectionally small portion and part of the cross-sectionally large portion of the needle through the component;

retracting the needle relative to the punch sufficiently so that the cross-sectionally small portion of the needle is in the opening in the component; and filling plastic into the form in the punch of the mold, so that the plastic flows into the opening and around the cross-sectionally small portion of the needle so that the plastic forms a surround around the needle and around the peripheral region of the opening in the component; and separating the needle and the punch from the component, thereby leaving the surround attached to the component and with the opening having an inside diameter equal to the outside diameter of the cross-sectionally small portion of the needle.

2. The method of claim 1, wherein the component is a sheet-like component and wherein the step of introducing the opening into the component is performed in the mold by moving the needle substantially perpendicularly with respect to the sheet-like component.

* * * * *